US008813235B2

(12) United States Patent
Sidagni

(10) Patent No.: US 8,813,235 B2
(45) Date of Patent: Aug. 19, 2014

(54) EXPERT SYSTEM FOR DETECTING SOFTWARE SECURITY THREATS

(75) Inventor: Michelangelo Sidagni, New York, NY (US)

(73) Assignee: NopSec Inc., New York, NY (US)

( * ) Notice: Subject to any disclaimer, the term of this patent is extended or adjusted under 35 U.S.C. 154(b) by 0 days.

(21) Appl. No.: 13/571,505

(22) Filed: Aug. 10, 2012

(65) Prior Publication Data

US 2014/0047545 A1    Feb. 13, 2014

(51) Int. Cl.
    *G06F 21/00*      (2013.01)

(52) U.S. Cl.
     USPC .............. 726/25; 713/189; 713/190; 713/191; 713/192; 713/193; 713/194

(58) Field of Classification Search
     USPC ....................................... 726/25; 713/189–194
     See application file for complete search history.

(56) References Cited

U.S. PATENT DOCUMENTS

| 6,883,101 | B1 * | 4/2005 | Fox et al. .......................... 726/25 |
| 7,861,299 | B1 * | 12/2010 | Tidwell et al. .................. 726/22 |
| 8,621,073 | B2 | 12/2013 | McClure et al. |
| 2002/0087882 | A1 | 7/2002 | Schneier et al. |
| 2008/0040802 | A1 | 2/2008 | Pierson et al. |
| 2010/0333002 | A1 | 12/2010 | Karabey et al. |
| 2012/0216190 | A1 | 8/2012 | Sivak |
| 2012/0317491 | A1 * | 12/2012 | Wong et al. .................... 715/736 |

OTHER PUBLICATIONS

"Using model checking to analyze network vulnerabilities", Ritchey et al., Proceedings of the 2000 IEEE Symposium on Security and Privacy; 10 Pages; IEEE Computer Society Washington, DC, USA 2000.

* cited by examiner

*Primary Examiner* — Ghazal Shehni
(74) *Attorney, Agent, or Firm* — Chadbourne & Parke LLP

(57) ABSTRACT

An instance of a vulnerability risk management (VRM) module and a vulnerability management expert decision system (VMEDS) module are instantiated in a cloud. The VMEDS module imports scan results from a VRM vulnerability database and saves them as vulnerabilities to be reviewed in a VMEDS database. The VMEDS module converts vulnerabilities into facts. The VMEDS module builds a rule set in the knowledge base to verify whether certain vulnerabilities are false positives. Rules related to a vulnerability are received in plain English from a web-based front-end application. The VMEDS module tests each rule against all of the facts using the Rete algorithm. The VMEDS module executes the action associated with the rule derived from the Rete algorithm. The VMEDS module stores the results associated with the executing of the action in the VMEDS database and forwards the results to the VRM module.

20 Claims, 16 Drawing Sheets

FIG. 5A

N©pSec (V)ulnerability (R)isk (M)anagement

Search | Settings | Logout

| Summary | Assets | Scans | Findings | Reports | Tickets | Web App Scan ▼ |

Summary
- Targets: http:/crackme.cenzic.com/Kelev/view/home.php
- Number of Hosts: 1
- Time Scanned: Aug. 24, 2011, 1:02 p.m.
- Time Completed: Aug. 24, 2011, 1:14 p.m.
- Number of Affected Hosts: 1
- Number of vulnerabilities: 51
- Risk Score:

View Report

Vulnerabilities

| Name | CVSSv2 | Description | Severity | CWE URL | References | Variable |
|---|---|---|---|---|---|---|
| SQL Injection | 9.0 | SQL code can be injected into the web application. | High | http://cwe.mitre.org/data/definitions/89.html | UnixWiz: http://unixwiz.net/techtips/sql-injection.html<br>Wikipedia: http://en.wikipedia.org/wiki/SQL_injection<br>Securi Team: http://www.securiteam.com/securityreviews/5DP0N1P76E.html<br>OWASP: http:// www.owasp.org/index.php/SQL_injection | _sample_values_ |
| SQL Injection | 9.0 | SQL code can be injected into the web application. | High | http://cwe.mitre.org/data/definitions/89.html | UnixWiz: http://unixwiz.net/techtips/sql-injection.html<br>Wikipedia: http://en.wikipedia.org/wiki/SQL_injection<br>Securi Team: http://www.securiteam.com/securityreviews/5DP0N1P76E.html<br>OWASP: http:// www.owasp.org/index.php/SQL_injection | txtLastName |
| SQL Injection | 9.0 | SQL code can be injected into the web application. | High | http://cwe.mitre.org/data/definitions/89.html | UnixWiz: http://unixwiz.net/techtips/sql-injection.html<br>Wikipedia: http://en.wikipedia.org/wiki/SQL_injection<br>Securi Team: | txtFirstName |

FIG. 7B

EXPERT SYSTEM FOR DETECTING SOFTWARE SECURITY THREATS

FIELD OF THE INVENTION

The present invention relates to software system security. More particularly, the present invention relates to a method and cloud-based system that employs an expert system for automating the life cycle of network auditing and vulnerability risk management for enterprise software systems.

BACKGROUND OF THE INVENTION

In recent decades, enterprises and public institutions have been automating their operations by employing internet and/or network-enabled computer systems. As a result of the introduction of the World Wide Web in the mid-1990's, the majority of enterprises and public institutions host web sites for both internal and external use. Enterprises and public institutions have been facing the challenge of rendering their web sites and e-commerce sites more interactive and user friendly. These web sites need to be protected against a vast growing number of sophisticated attacks and malware injections in which "hackers" seek to "take over the machine."

Conventional IT security practice has shown that most organizations struggle in regularly testing and auditing systems for emerging IT security vulnerabilities. Such systems may provide only a list of problems that have been identified, and leave the organization with the task of sifting through a large amount of data in order to identify real issues.

Many organization employ conventional security vulnerability scanners to combat hacking and malware attacks. Unfortunately, conventional vulnerability scanners suffer from several imperfections. The potential vulnerabilities reported by conventional vulnerability scanners include a large number of false positive and conclusions rendered may be either incomprehensive, inaccurate, or both. Traditionally, to solve this problem, one or more human security experts have been employed to review and verify unverified vulnerabilities. However, the reviewing process may be laborious and may include abundant duplication of efforts. Further, disagreements among security experts frequently result based on individual skill sets, including knowledge of hacking techniques and other vulnerabilities. It also becomes necessary to periodically rehire consultants to re-test as networks and applications change. All of these factors increase total cost of ownership (TCO) of computer systems and web sites.

Accordingly, what would be desirable, but has not yet been provided, is an automated testing system and method that employs an expert system to automating the life cycle of network auditing and vulnerability risk management for enterprise software systems.

SUMMARY OF THE INVENTION

The above-described problems are addressed and a technical solution is achieved in the art by providing a method and cloud-based system that employs an expert system to automate the life cycle of network auditing and vulnerability risk management for enterprise software systems. In one embodiment, an instance of a vulnerability risk management (VRM) module and a vulnerability management expert decision system (VMEDS) module are instantiated in a cloud. The VMEDS module imports scan results from a VRM vulnerability database and saves the scan results as vulnerabilities to be reviewed in a VMEDS database. The VMEDS module converts vulnerabilities into facts. The VMEDS module builds a rule set in the knowledge base to verify whether certain vulnerabilities are false positives, whether the vulnerabilities reported represent useful information, and whether a risk reported is accurate based on circumstances. Rules related to a vulnerability are received in plain English, converted to an internal representation, and stored in a backend VMEDS database.

In an embodiment, the VMEDS module tests each rule against the facts using the Rete algorithm. The VMEDS module places the right hand side (actions) of rules whose left hand side was satisfied into a set. The VMEDS module selects an action from the set to run using a conflict resolution strategy.

In an embodiment, if any facts have been modified, then the previous three steps are repeated until there are no more rule modifications. The VMEDS module executes the action associated with the rule derived from the Rete algorithm. The VMEDS module stores the results associated with the execution of the action in the VMEDS database and forwards the results to the VRM module.

In one embodiment, above-described problems are addressed and a technical solution is achieved in the art by providing a method and system for vulnerability risk management of an enterprise computer system. An expert system receives a list of potential vulnerabilities of the enterprise computer system from a vulnerability risk management module, where the expert system and the vulnerability risk management module are instantiated by a cloud computing system. The expert system modifies the list of potential vulnerabilities into a refined list of vulnerabilities. The expert system transmits the refined list of vulnerabilities to the vulnerability risk management module.

In an embodiment, modifying the list of potential vulnerabilities into a refined list of vulnerabilities comprises: converting the list of potential vulnerabilities into a set of facts; testing a set of rules against the set of facts, wherein an action associated with a rule is executed to modify a fact of the set of facts to produce a modified set of facts; and converting the modified set of facts to a refined list of vulnerabilities.

In one embodiment, testing the set of rules against the set of facts comprises applying a Rete algorithm to activate a plurality of actions associated with the set of rules. Testing the set of rules against the set of facts may further comprise selecting the action to be executed from a plurality of actions activated by the application of the Rete algorithm. Testing the set of rules against the set of facts may further comprise imposing an ordering of execution of the plurality of activated actions using a conflict resolution strategy.

In an embodiment, imposing the ordering of execution of the plurality of activated actions using the conflict resolution strategy may comprise: (a) placing a newly activated rule and associated activated actions above a rule of lower salience and below a rule of higher salience; and (b) applying the conflict resolution strategy to determine a placement of activated rules of equal salience. If steps (a) and (b) cannot specify an ordering, activated rules may be arbitrarily ordered.

In an embodiment, the conflict resolution strategy is one of depth, breadth, simplicity, complexity, lex, mea, or random.

In an embodiment, the refined list of vulnerabilities is substantially free of at least one of extraneous information or a false positive.

In an embodiment, the set of rules is based on a received type of vulnerability.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIGS. 5A and 5B are example screen shots of reports of vulnerabilities presented in detailed or executive summary form on a remote web-based dashboard, respectively;

Figure 1:
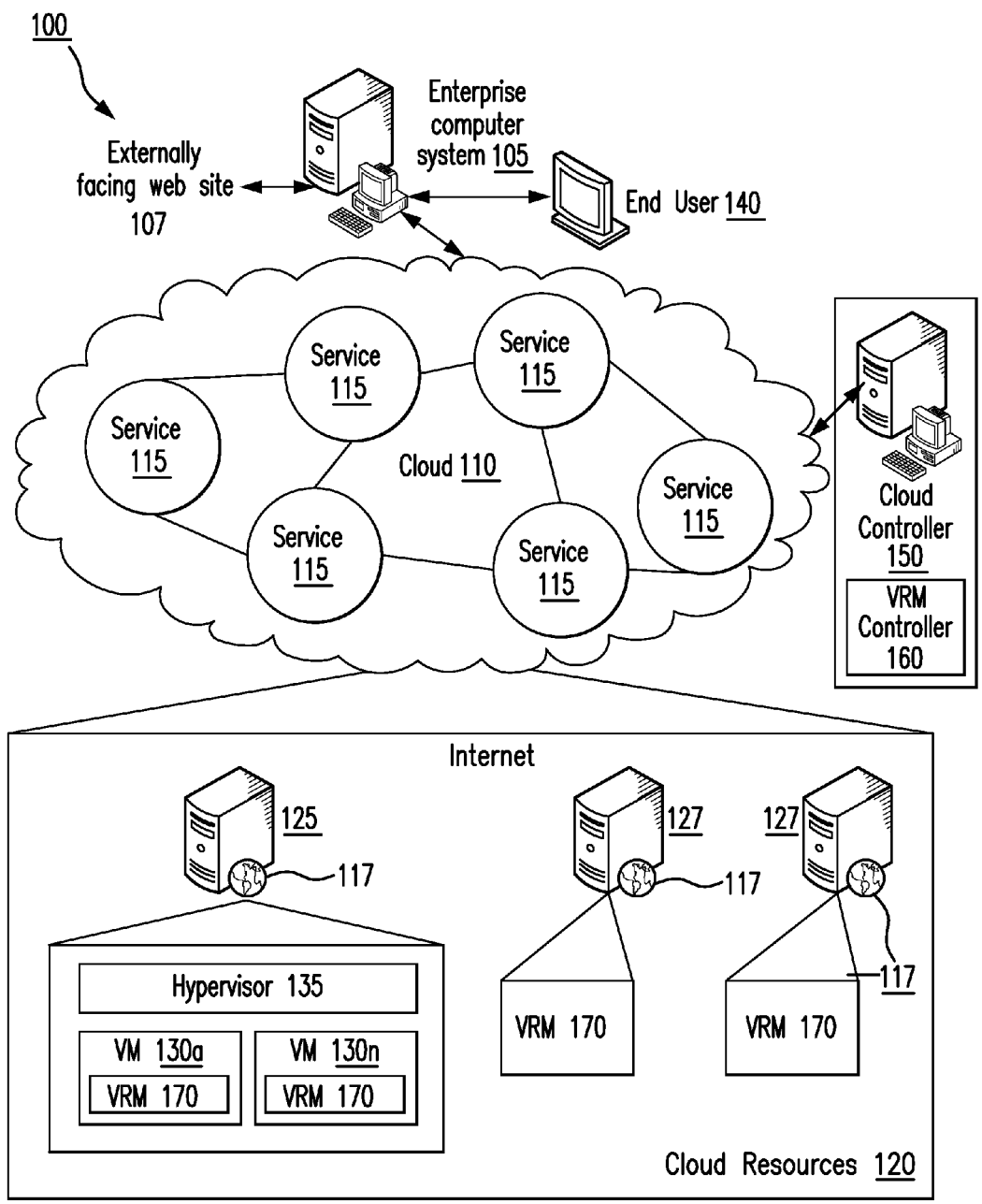
FIG. 1 illustrates an exemplary distributed management environment in which embodiments of the present invention may operate.

It is to be understood that the attached drawings are for purposes of illustrating the concepts of the invention and may not be to scale.

DETAILED DESCRIPTION OF THE INVENTION

The present invention relates to a method and cloud-based system that employs an expert system to automating the life cycle of network auditing and vulnerability risk management for enterprise software systems.

As used herein, the term "program", "application", "software package" or "computer executable instructions" refers to instructions that may be performed by a processor and/or other suitable components. The term "computer" or "server", as used herein, is not limited to any one particular type of hardware device, but may be any data processing device such as a desktop computer, a laptop computer, a kiosk terminal, a personal digital assistant (PDA) or any equivalents or combinations thereof. Any device or part of a device configured to process, manage or transmit data, whether implemented with electrical, magnetic, optical, biological components or otherwise, may be made suitable for implementing the invention described herein.

As used herein, the term communicatively connected is intended to include any type of connection, whether wired or wireless, in which data may be communicated. Furthermore, the term "communicatively connected" is intended to include a connection between devices and/or programs within a single computer or between devices and/or programs on separate computers.

Although specific embodiments have been illustrated and described herein, those of ordinary skill in the art will appreciate that an arrangement configured to achieve the same results may be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used.

As used herein, the terms "cloud" or "cloud computing" are the provisioning of dynamically scalable and often virtualized resources as a service over the Internet on a utility basis. Users need not have any knowledge of, expertise in, or control over the technology infrastructure in the "cloud" that supports them. Cloud computing services often provide common business applications online that are accessed from a web browser, while the software and data are stored on servers.

Cloud computing customers do not generally own the physical infrastructure serving as host to the software platform in question. They typically consume resources as a service and pay only for resources that they use. The majority of cloud computing infrastructures typically include services delivered through data centers and built on servers with different levels of virtualization technologies. The services are accessible from various locations that provide access to networking infrastructure. Clouds often appear as single points of access for all consumers' computing needs.

Cloud computing is quickly becoming the platform of choice for businesses that want to reduce operating expenses and be able to scale resources rapidly. Eased automation, flexibility, mobility, resiliency, and redundancy are several other advantages of moving resources to the cloud. On-premise private clouds permit businesses to take advantage of cloud technologies while remaining on a private network. Public clouds permit businesses to make use of resources provided by third party vendors. Hybrid clouds permit the best of both public and private cloud computing models. Many organizations are being introduced to cloud computing by employing the services of an off-premise third party cloud based on a Software-as-a-Service (SaaS) architecture. As used herein, Software-as-a-Service is a software delivery model in which software and associated data are centrally hosted on the cloud. SaaS is typically accessed by users using a thin client via a web browser. One of the biggest selling points for an enterprise to employ an SaaS cloud for vulnerability management and remediation is the potential to reduce IT support costs by outsourcing hardware and software maintenance and support to the SaaS provider.

Embodiments of the present invention employ an SaaS solution that is based on a multi-tenant architecture. With this model, a single version of the application, with a single configuration (hardware, network, operating system), is used for all customers ("tenants"). To support scalability, the application is installed on multiple machines (called horizontal scaling).

The single tenant architectural configuration to be described below may employ one or more physical host machines or virtual machines (VMs) in the cloud (hereinafter referred to as "nodes"). For VMs, each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way.

FIG. 1 illustrates an exemplary distributed management environment 100 in which embodiments of the present invention may operate. The distributed management environment 100 may be, but is not limited to, a cloud 110 comprising dynamically scalable and virtualized resources used to provide services 115 over the Internet 117 to assess vulnerabilities of an enterprise computer system 105 and/or an externally-facing web site 107 associated with an end user 140. The cloud 110 may be an external public cloud. The cloud 110 may be part of an enterprise cloud computing solution produced by NopSec of Brooklyn, N.Y.

One or more end users 140 may access and utilize the services 115 via client programs without having to maintain dedicated hardware on their end. In one embodiment, a cloud controller 150 is provided to manage the resources and services of the cloud 110. More particularly, the cloud controller 150 is configured to implement a vulnerability risk management (VRM) controller 160 for instantiating, starting, executing, and coordinating, on a per enterprise/end user/customer basis (i.e., the enterprise computer system 105 associated with an end user 140 to be monitored for vulnerabilities), a corresponding vulnerability risk management (VRM) module 170 on an individual physical machine 127 or a virtual machine (VM) (e.g., 130a) to automate the life cycle of the corresponding enterprise computing system 105. In some embodiments, a host controller 125 may reside on a designated computer system (e.g., a server computer, a desktop computer, etc.) or be part of a host machine 125 or another machine. More particularly, one end user 140 is apportioned a single logical instance of cloud resources (i.e., a single instance of a cloud) that is logically separate from that of another end user 140 (i.e., no data or database resources or virtual machines are shared between end users 140).

As illustrated, a break-out box of the cloud 110 shows the actual cloud resources 120 including hardware that may be employed by embodiments of the invention as computing resources of the cloud 110. In one embodiment, one or more host machines 125 may be utilized to execute a plurality of virtual machines (VMs) 130a-130n (i.e., the nodes 130a-130n) that may be used as cloud computing resources. In embodiments of the invention, each host machine 125 is capable of running one or more virtual machines (VMs) 130a-130n. Each of the VM s 130a-130n runs a guest operating system (OS) that may be different from one another. Each of the VM s 130a-130n is configured to execute an instance of a VRM module 170. The guest OS may include Microsoft Windows, Linux, Solaris, etc. The host machine 125 may include a hypervisor 135 that emulates the underlying hardware platform for the VMs 130a-130n. The hypervisor 135 may also be known as a virtual machine monitor (VMM), a kernel-based hypervisor, or a host operating system. In one embodiment, each of the VM 130a-130n may be accessed by one or more of enterprise computer systems 105 associated with end users 140 over a network 117. The network 117 may be a private network (e.g., a local area network (LAN), wide area network (WAN), intranet, etc.) or a public network (e.g., the Internet). In another embodiment, a physical machine 127 (i.e., the nodes 127) may be utilized directly as cloud computing resources to execute an instance of a VRM module 170.

Figure 2:
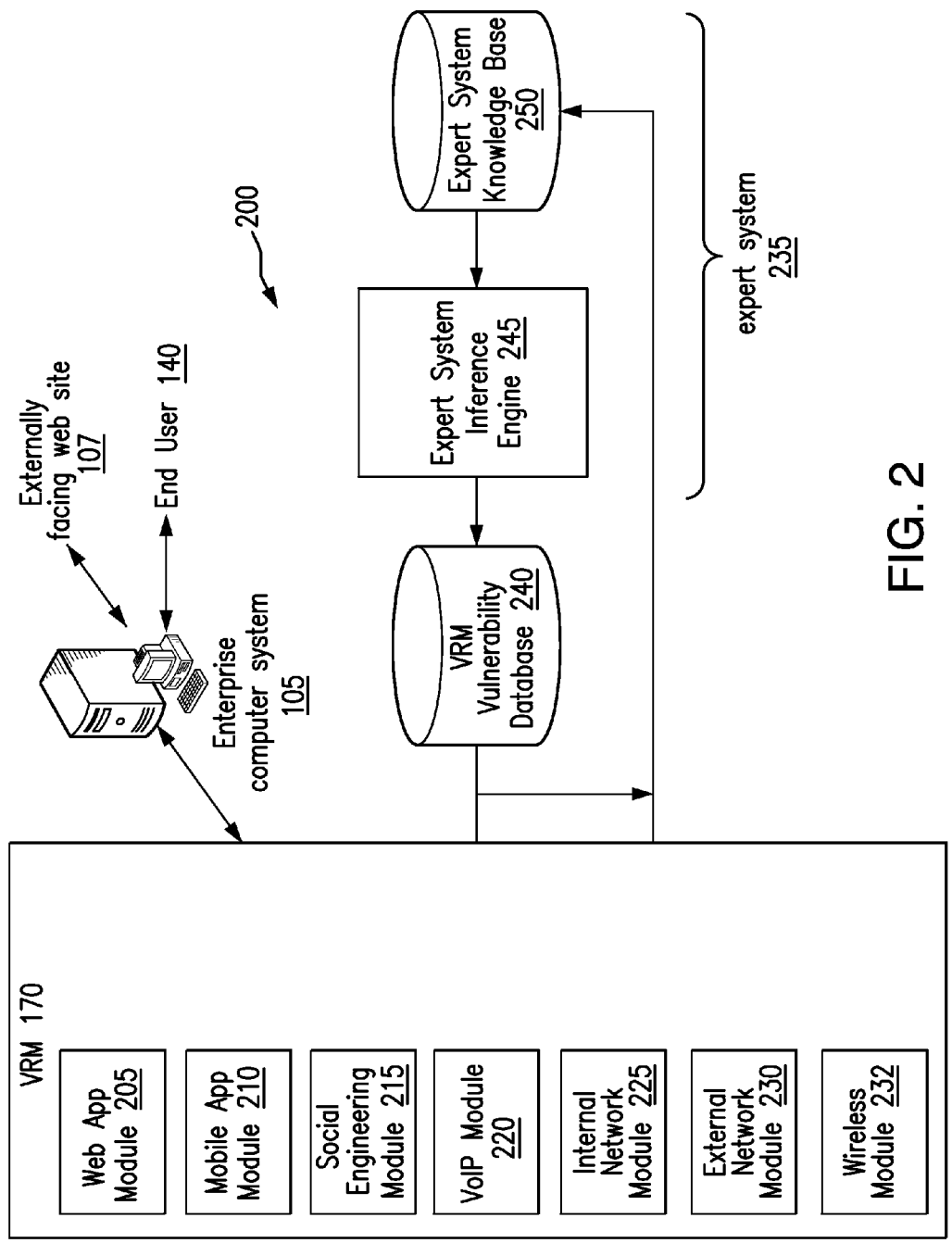
FIG. 2 illustrates an architecture of one embodiment of one instance of a vulnerability risk management module (VRM) configured to operate in conjunction with an artificial intelligence (AI) expert engine for detecting and assessing vulnerabilities of enterprise computer systems associated with end users.

FIG. 2 illustrates an architecture 200 of one embodiment of one instance of vulnerability risk management module (VRM) 170 configured to operate in conjunction with an artificial intelligence (AI) expert engine 245 for detecting and assessing vulnerabilities of enterprise computer systems 105 associated with end users 140. The computing architecture 200 includes the cloud 110 (not shown). The VRM 170 may include one or more modules 205-232 for performing vulnerability checks on a vulnerability type basis. Such modules may include a Web application module 205, a mobile application module 210, a social engineering module 215, a voice-over Internet protocol (VoIP) module 220, an internal network module 225, an external network module 230, and a wireless module 232.

Figure 3:
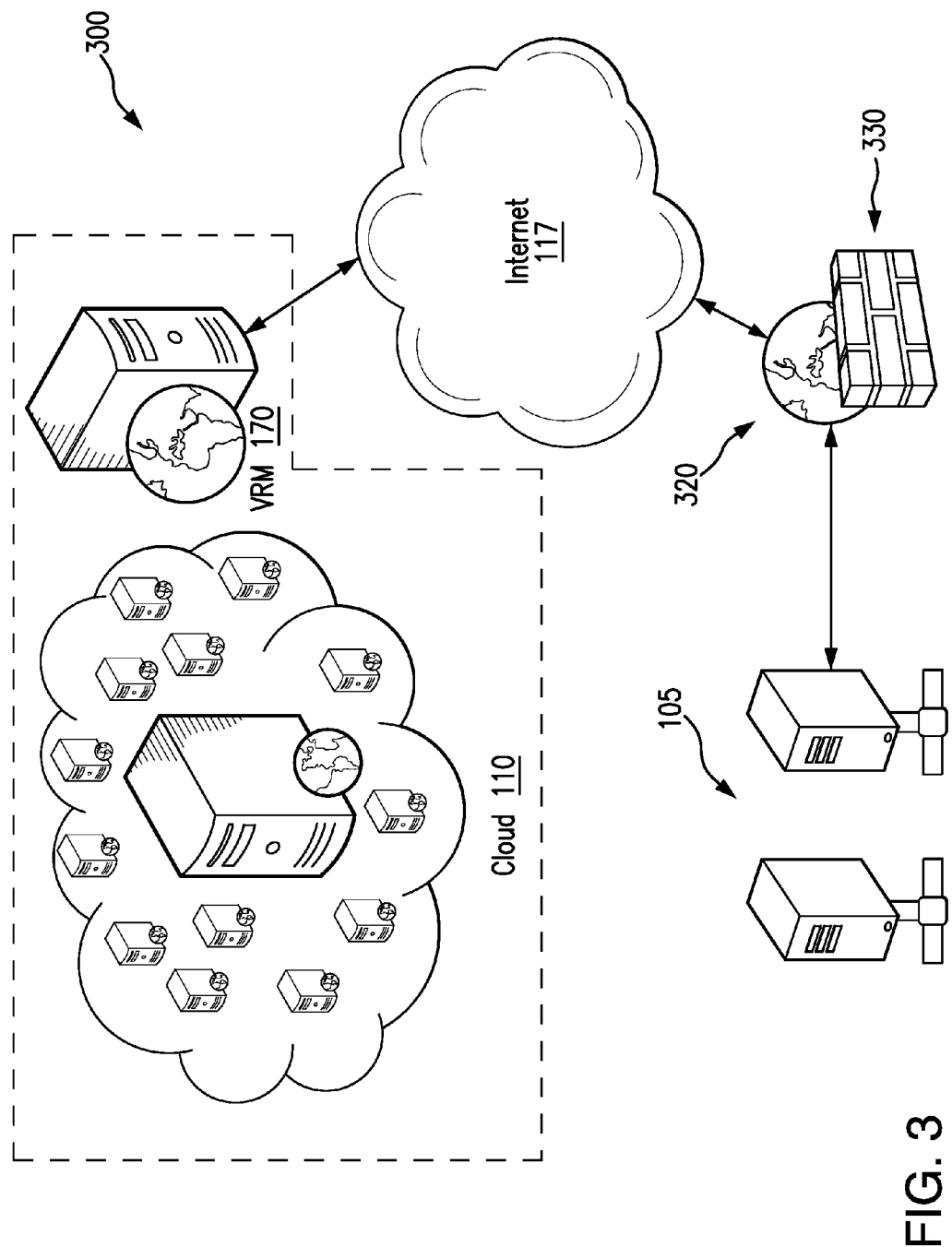
FIG. 3 illustrates one embodiment of a configuration of an external network module operating in conjunction with an enterprise computing system.

FIG. 3 illustrates one embodiment of a configuration 300 of the external network module 230 operating in conjunction with an enterprise computing system 105. The external network module 230, as part of an instance of a VRM 170 in the cloud 110, may operate via the Internet 117 to access an external network 320 in front of a firewall 330 associated with the enterprise computing system 105. The external network module 230 is configured to perform unauthenticated or authenticated external network scans and provide a report of threats to the external network 320 associated with the client enterprise computing system 105. The scans employ non-intrusive scanning techniques, i.e., there is minimal impact on network resources when a scan is in progress. Scans may be scheduled. The external network module 230 is secured by a dual factor log-in provided on an independent cloud based server in the cloud 110 so that there is no shared database between one enterprise computing system and another.

Figure 5A:
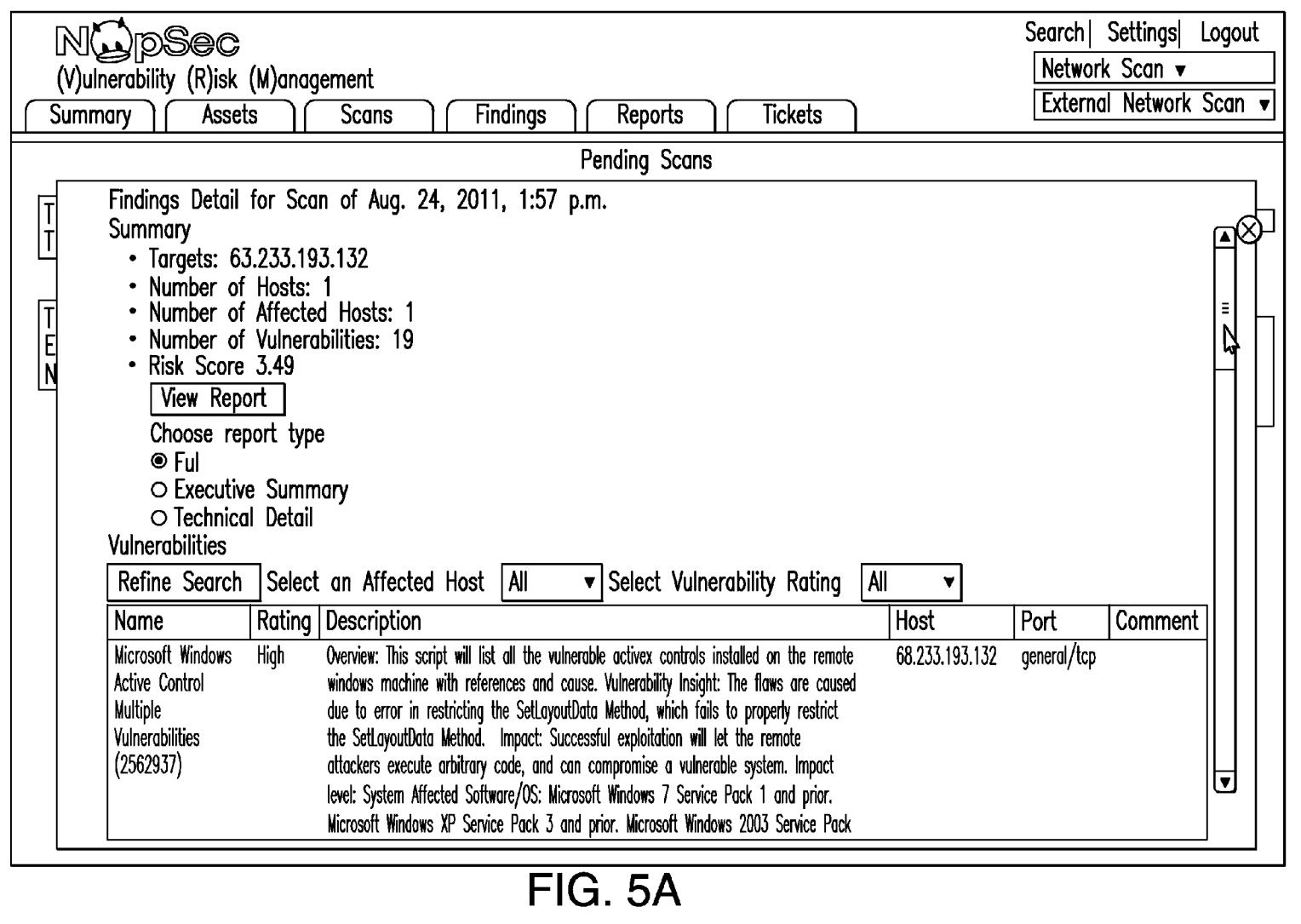
Figure 5B:
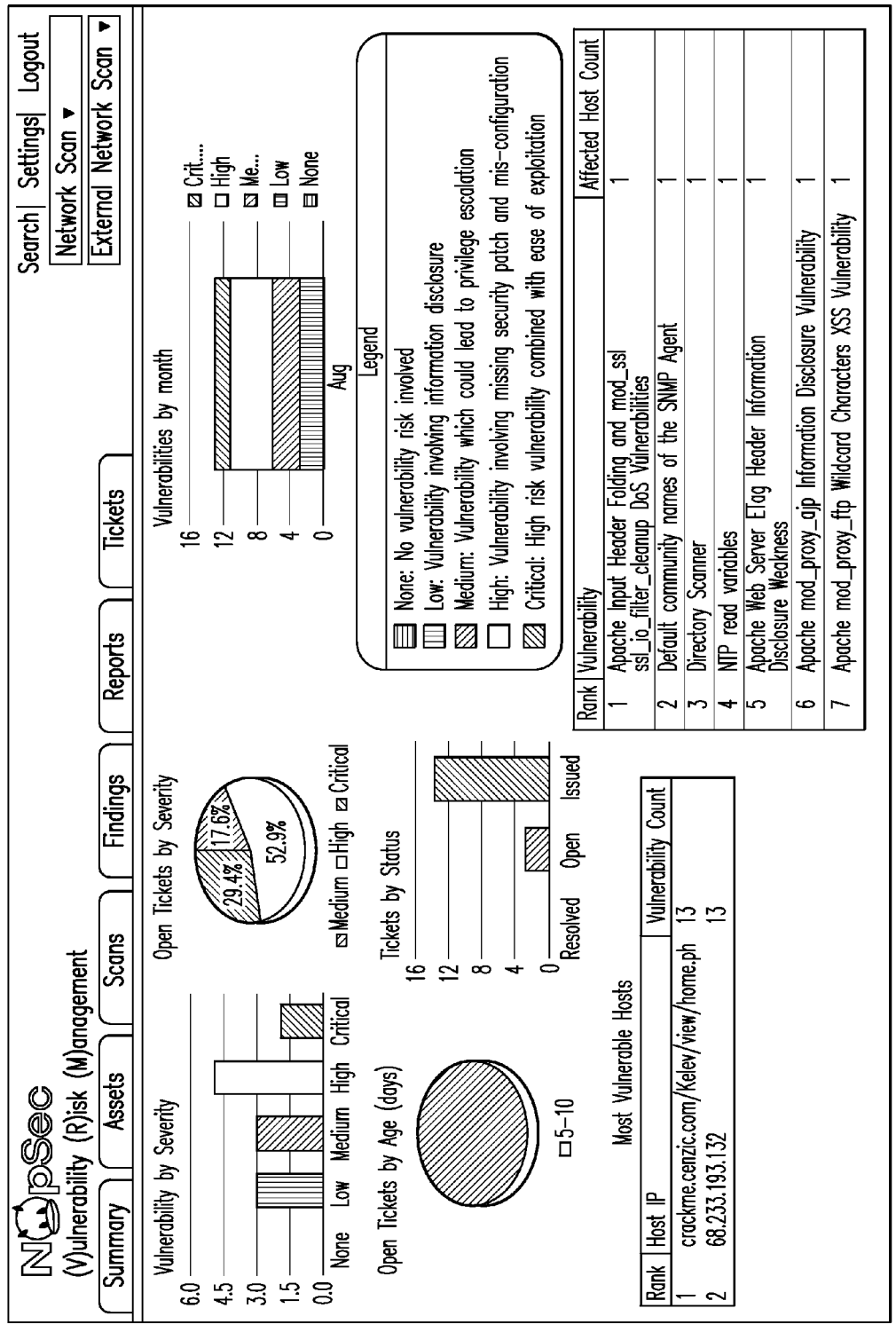

In an embodiment, the external network module 230 is configured to automate the life cycle of network auditing and vulnerability management across the enterprise computing system 105, including network discovery and mapping, asset prioritization, vulnerability assessment reporting and charting, and remediation tracking and ticketing system according to business risk. Reports of vulnerabilities may be presented in detailed or executive summary form on a remote web-based dashboard (see FIGS. 5A and 5B, respectively).

Figure 4:
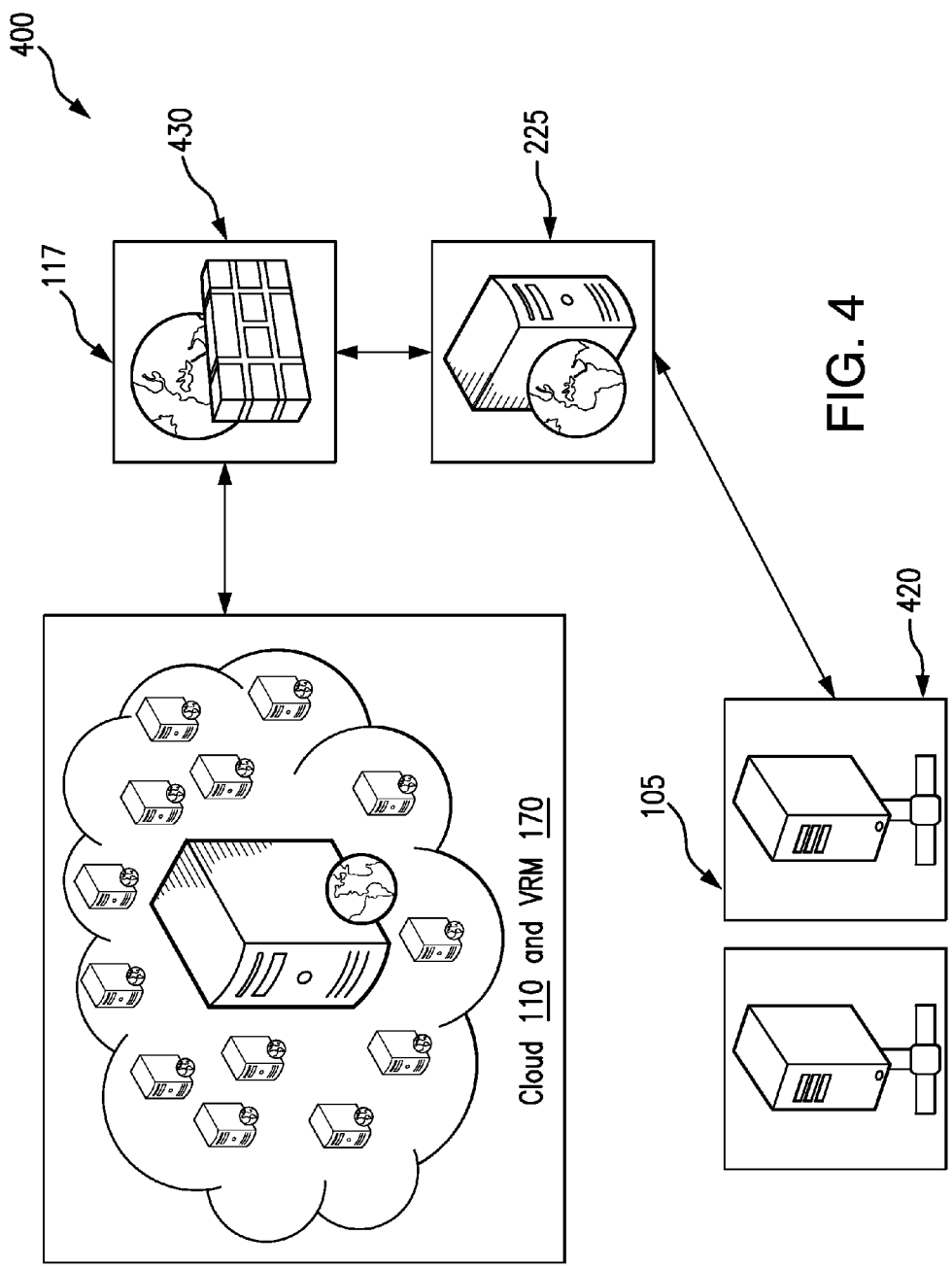
FIG. 4 illustrates one embodiment of a configuration of an internal network module operating in conjunction with an enterprise computing system.

FIG. 4 illustrates one embodiment of a configuration 400 of the internal network module 225 operating in conjunction with an enterprise computing system 105. The internal network module 225, although associated with an instance of a VRM 170 in the cloud 110, also referred to as a VRM Appliance 225, is a server distinct from the cloud 110 and configured to access and test an internal network 420 located behind a firewall 430 of the enterprise computing system 105. The internal network module 225 is configured to perform internal asset management, internal network authenticated or unauthenticated scanning, and monitor critical OS and application directories for changes and responses of the internal network 420 of the enterprise computing system 105. The internal scans are configurable for customized audits, permitting global scans, or scan of specific parts of the internal network 420 on additional infrastructure. The internal network module 225 is secured by a dual factor log-in provided on an independent cloud based server in the cloud 110 so that there is no shared database between one enterprise computing system and another.

In an embodiment, the internal network module 225 is configured to automate the life cycle of internal network auditing and vulnerability management across the enterprise computing system 105, including network discovery and mapping, asset prioritization, vulnerability assessment reporting and charting, and remediation tracking and ticketing system according to business risk. Reports of vulnerabilities may be presented in detailed or executive summary form on a remote web-based dashboard (see FIGS. 5A and 5B, respectively).

Returning to FIG. 2, the VRM 170 further includes the Web application module 205 available to enterprise computing systems 105 having an Internet-facing website that need help to protect against threats such as SQL and other malware injections, and to help to meet the requirements of regulations for card payments such as PCI compliance.

The Web application module 205 is further configured to locate security vulnerabilities that are included in the Open Web Application Security Project (OWASP) Top 10 and the Web Application Security Consortium (WASC) Threat Classification taxonomies. The Web application module 205 trains itself by learning from HTTP responses it receives during an audit process of the Internet-facing website of the enterprise computing systems 105. The Web application module 205 accounts for the dynamic nature of web applications and can detect changes caused while traveling through the paths of a web application's cyclomatic complexity. As a result, attack/input vectors are detected that would otherwise be undetectable by non-humans. The Web application module 205 may employ a browser Java applet Web spider to manually browse the Internet-facing website of the enterprise computing systems 105, so that the Web spider can reach links and forms that are not reachable by an automatic scanner.

The Web application module 205 can detect credit card information and mask the data it captures. The Web application module 205 provides access to all inbound and outbound data with no latency. The Web application module 205 is secured by a dual factor log-in provided on an independent cloud based server in the cloud 110 so that there is no shared database between one enterprise computing system and another. The Web application module 205 employs an asynchronous HTTP model to improve performance. The Web application module 205 module further offers:

TABLE 1

Figure 6A:
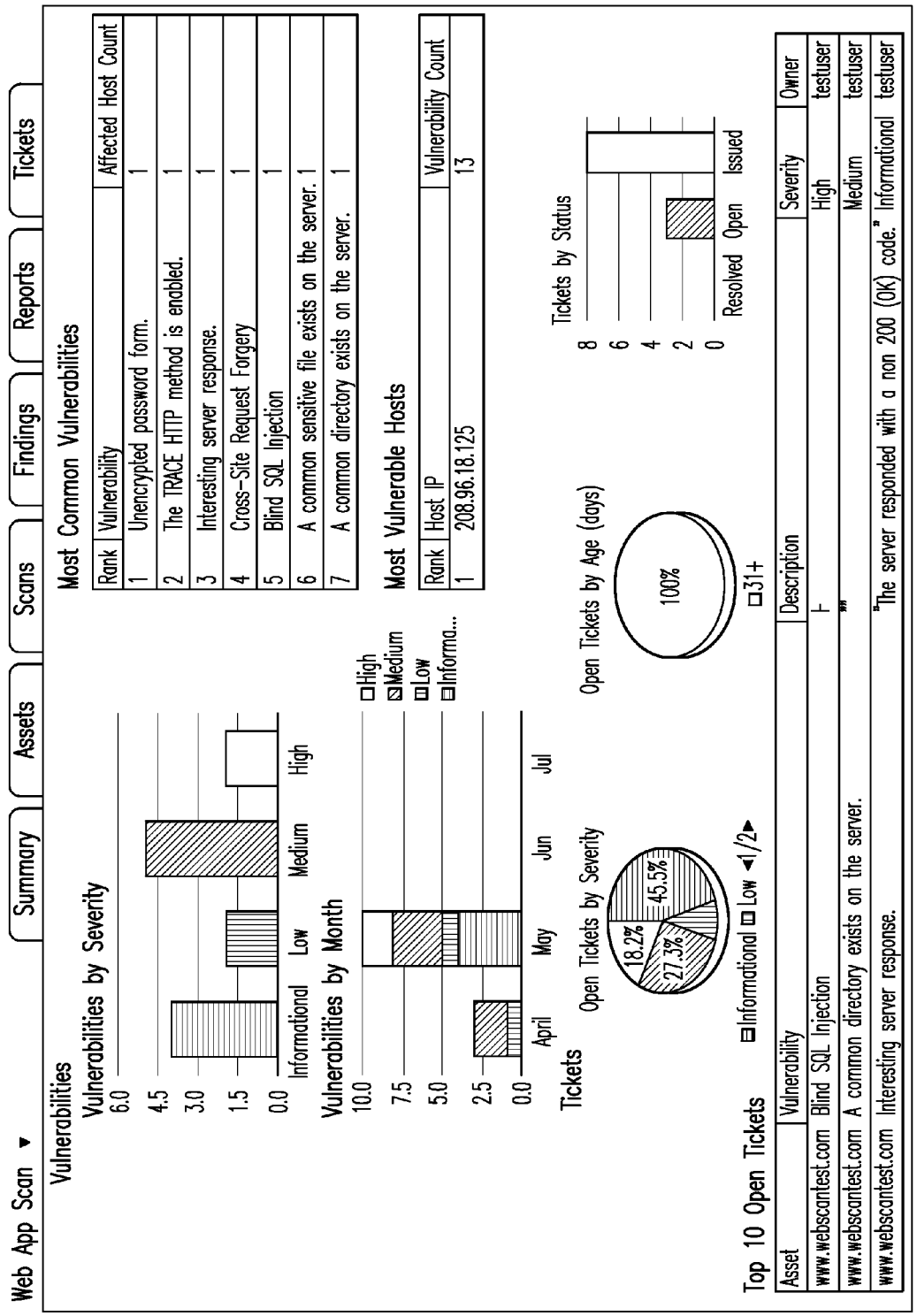
FIG. 6A is a screen shot of an interactive chart dashboard.
Figure 6B:
FIG. 6B is a screen shot of an interactive asset map for web applications and web server fingerprinting.
Figure 7A:
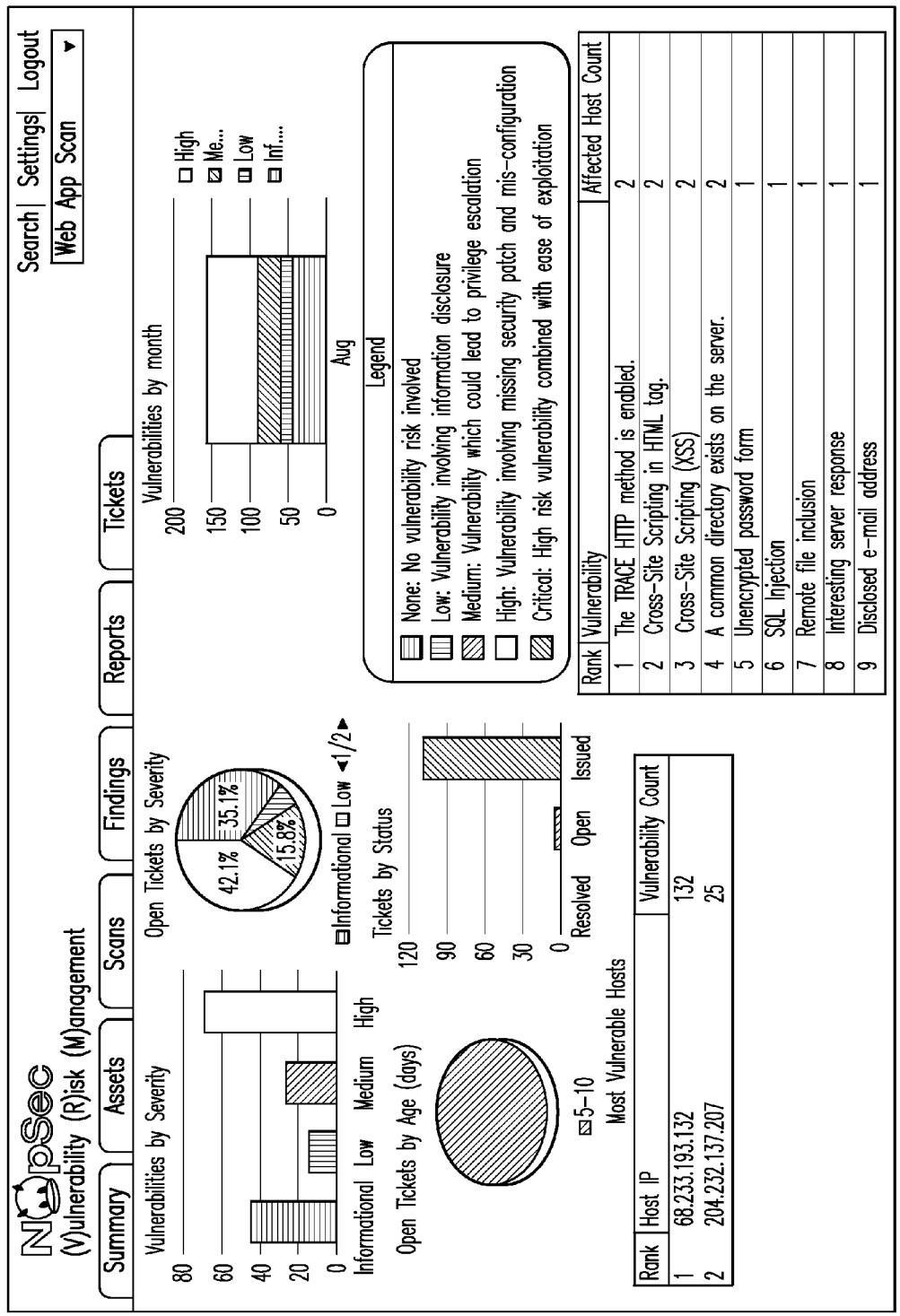
FIG. 7 is a screen shot of an executive summary, technical details and a full report.

An interactive Chart Dashboard (see FIG. 6A)
An interactive asset map for web application and web server fingerprinting (see FIG. 6B)
An on-demand scan feature including date, time, credentials, scan template, differential scan and manual scan with Java applet browser
Vulnerability Re-testing functionality
Visual rendering of the affected and vulnerable web applications pages
VRM signature "false-positive" elimination workflow interacting with the NopSec Penetration Testing Team in the back-end
HTML and PDF reports including Executive Summary, Technical Details and Full Report (see FIG. 7)
An interactive Trouble Ticketing System to escalate and resolve the web application security vulnerabilities identified The Web application module 205 supports scan templates. Scan templates are created by a penetration testing team to provide custom tailored audits to cover specific web application vulnerabilities (e.g., SQL injection, Cross-Site Scripting (XSS), Directory Transversal, Cross-Site Request Forgery, etc.).

Returning to FIG. 2, the VRM 170 further includes a mobile application module 210 The mobile application module 210 is configured to install agents on the Apple iOS, the Android, and the Blackberry operating system, inventory the mobile systems, monitor these systems for the presence of malicious applications, and monitor device actions that may indicate that a malicious application is installed or that the user is leaking corporate confidential documents. All this may be controlled from a central web-based cloud dashboard (not shown).

The VRM 170 further includes a social engineering module 215. The social engineering module 215 permits an organization to send phishing email on-demand to attempt to induce users to click on email links that may cause their desktops to be high-jacked. The process is managed through an easy-to-use management web-based dashboard (not shown).

The VRM 170 further includes a VoIP module 220. The VoIP module 220 helps find vulnerabilities in the VoIP infrastructure (e.g., including telephones and gateways). Scanning engines of the VoIP module 220 are located both outside and inside an organization's firewall. The scanning engines of the VoIP module 220 identify vulnerabilities in telephones and VoIP network infrastructure related to confidentiality, integrity and availability. The assessment process is managed through an easy-to-use management web-based dashboard (not shown).

The VRM 170 further includes a wireless module 232. The wireless module 232 permits organizations to detect vulnerabilities which may have been enabled by mis-configurations of wireless access points and controllers as well as the wrong logical positioning of a wireless network within an enterprise computing system. By employing a wireless module 232, the enterprise computing system may: (1) perform wireless site surveys of system wireless network signals and other neighboring wireless access points; (2) perform rogue access point detection via wireless and wired network scans; (3) performing WEP, WPA, and WPA2 wireless network encryption key cracking via dictionary and brute force using cloud computing resources; and (4) obtain executive summary and/or technical reports of periodic wireless network security assessments.

As true of all VRM modules, the modules 210, 215, 220, 232 are secured by a dual factor log-in provided on an independent cloud based server in the cloud 110 so that there is no shared database between one enterprise computing system and another.

Returning to FIG. 2, the raw vulnerability data collected by the modules 205-232 are stored in a VRM vulnerability database 240. The data stored in the VRM vulnerability database 240 is further processed to assess whether any of the detected vulnerabilities may be false positives, useless information, and whether the vulnerabilities have been assigned a correct risk value. False positives are removed and vulnerabilities further assessed by an artificial intelligence (AI) expert system 235. More particularly, the expert system 235 includes an inference engine 245 configured for automatically reviewing, verifying, and discovering potential security vulnerabilities of an enterprise computing systems 105 and a human designed and refined knowledge base 250.

An expert system is a computer system that emulates the decision-making ability of a human expert. It is designed to solve complex problems by "reasoning" about knowledge, similar to a human expert, instead of by following procedural algorithms as is the case in conventional programming. An expert system has two parts, one fixed, independent of the expert system: the inference engine 245, and one variable: the knowledge base 250. To run an expert system, the inference engine 245 reasons about the knowledge base 250.

The expert system 235 may be implemented using, for example, the public domain package CLIPS (The name is an acronym for "C Language Integrated Production System") to implement the inference engine 245. CLIPS is a public domain software tool for building expert systems. The CLIPS inference engine 245 may be written, for example, in the Python programming language. PyClips may be employed as the interface between Python programming language and the CLIPS environment. The overall expert system 235 may be a Django Application under Django web framework.

The versions and licenses of open source software employed to build the expert system 235 are listed in Table 2 as follows:

TABLE 2

| Software | License |
| --- | --- |
| CLIPS 6.24 | Public Domain Software |
| Pyclips 1.0.7 | LGPL (Lesser General Public License) |
| Django 1.3.0 | BSD (Berkeley Software Distribution) |
| Python 2.7.2 | PSFL (Python Software Foundation License) |

Three basic constructs are frequently employed in building experts systems in general, and the CLIPS-based expert system 235 in particular—a template, a fact and a rule. A "template" refers to a construct for ordering non-ordered facts and for accessing fields of facts by name. A template is analogous to a record or structure definition in programming languages such as Pascal and C. In an object-oriented analogy, a template is similar to class. A "fact" is high-level form for representing information in a CLIPS system. Each fact represents a piece of information which has been placed in a current list of facts, known as a fact-list. Facts are the fundamental unit of data used by rules. Facts are entities that the expert system 235 evaluates. In an object-oriented analogy, facts are instances of a class.

In an embodiment, the vulnerabilities determined by the modules 205-232 of the VRM module 170 are retrieved from the VRM vulnerability database 240 and stored in the knowledge base 250 are represented as facts. The inference engine 245 is configured to test against each data field of the facts, as well as to modify data fields (e.g., vulnerability status, risk factor, etc.).

Figure 8:
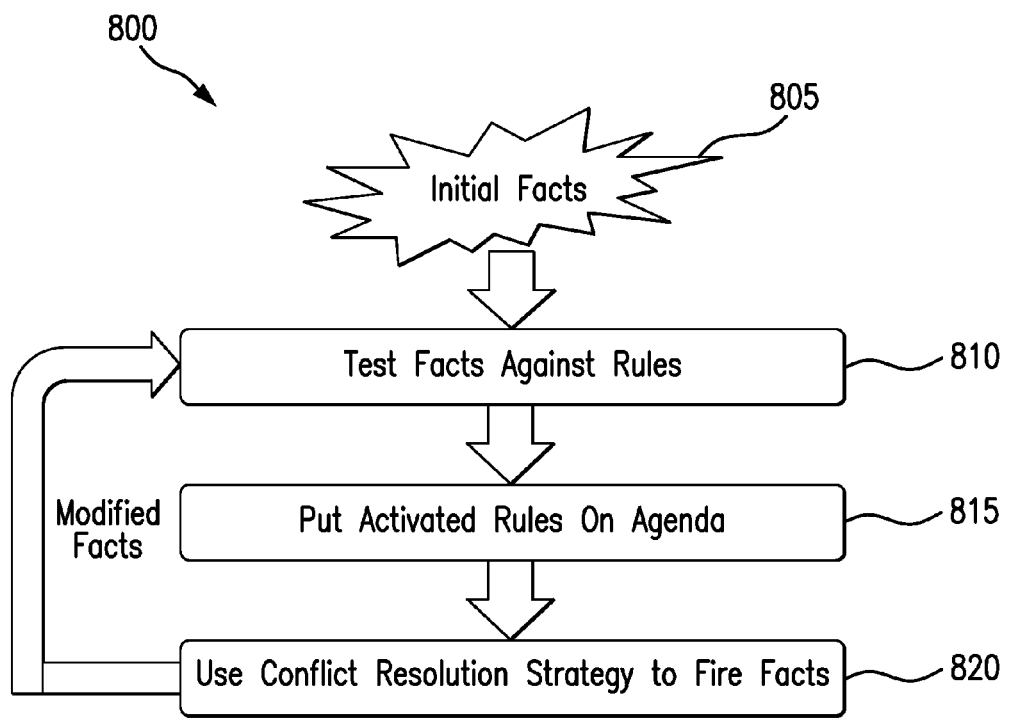
FIG. 8 is a dataflow illustrating one embodiment of a cycle of rule execution employed in the inference engine of FIG. 2.

"Rules" are used to represent heuristic knowledge, or "rules of thumb", which specify a set of actions to be performed for a given situation. The developer of an expert system defines a set of rules which collectively work together to solve a problem. A rule is composed of an antecedent and a consequent. The antecedent of a rule is also referred to as the "if" portion or the left-hand side (LHS) of the rule. The consequent of a rule is also referred to as the "then" portion or the right-hand side (RHS) of the rule. The inference engine 245 is the mechanism provided by CLIPS which automatically matches patterns against the current state of the fact list and determines which rules are applicable. FIG. 8 is a dataflow illustrating one embodiment of a cycle of rule execution 800 employed in the inference engine 245. At block 805, initial facts are retrieved from the VRM vulnerability database 240 and stored in the knowledge base 250. The initial facts are vulnerability records imported from VRM module 170 scan results. At block 810, the inference engine 245 tests the facts against all rules located in the knowledge base 250. Rules are composed by human experts and incorporated into the expert system 235 as python modules to be described herein below. At block 815, the inference engine 245 places activated rules on an agenda. More particularly, the inference engine 245 places all facts that pass the LHS of a specific rule (called activated facts) on an agenda. The agenda is the list of all rules which have their conditions satisfied (and have not yet been executed). Each module has its own agenda. The agenda behaves in a similar fashion to a stack (the top rule on the agenda is the first one to be executed). At block 820, the inference engine 245 employs a conflict resolution strategy to decide which activated fact should be executed first. When a rule is newly activated, its placement on the agenda is based (in order) on the following factors:

(a) Newly activated rules are placed above all rules of lower salience and below all rules of higher salience.

(b) Among rules of equal salience, the current conflict resolution strategy is used to determine the placement among the other rules of equal salience.

(c) If a rule is activated (along with several other rules) by the same assertion or retraction of a fact, and steps (a) and (b) cannot specify an ordering, then the rule is arbitrarily (i.e., not randomly) ordered in relation to the other rules with which it was activated. Note, in this respect, the order in which rules are defined has an arbitrary effect on conflict resolution (which is highly dependent upon the current underlying implementation of rules).

CLIPS provides seven conflict resolution strategies: depth, breadth, simplicity, complexity, lex, mea, and random. The default strategy is depth. The current strategy can be set by using the "setstrategy" command (which reorders the agenda based upon the new strategy).

Depth Strategy

Newly activated rules are placed above all rules of the same salience. For example, given that fact-a activates rule-1 and rule-2 and fact-b activates rule-3 and rule-4, then if fact-a is asserted before fact-b, rule-3 and rule-4 will be above rule-1 and rule-2 on the agenda. However, the position of rule-1 relative to rule-2 and rule-3 relative to rule-4 will be arbitrary.

Breadth Strategy

Newly activated rules are placed below all rules of the same salience. For example, given that fact-a activates rule-1 and rule-2 and fact-b activates rule-3 and rule-4, then if fact-a is asserted before fact-b, rule-1 and rule-2 will be above rule-3 and rule-4 on the agenda. However, the position of rule-1 relative to rule-2 and rule-3 relative to rule-4 will be arbitrary.

Simplicity Strategy

Among rules of the same salience, newly activated rules are placed above all activations of rules with equal or higher specificity. The specificity of a rule is determined by the number of comparisons that need to be performed on the LHS of the rule. Each comparison to a constant or previously bound variable adds one to the specificity. Each function call made on the LHS of a rule as part of the :, =, or test conditional element adds one to the specificity. The boolean functions and, or, and not do not add to the specificity of a rule, but their arguments do. Function calls made within a function call do not add to the specificity of a rule. For example, the following rule

```
(defrule example
 (item ?x ?y ?x)
 (test (and (numberp ?x) (> ?x (+ 10 ?y)) (< ?x 100)))
=>)
``` has a specificity of 5. The comparison to the constant item, the comparison of ?x to its previous binding, and the calls to the numberp, <, and > functions each add one to the specificity for a total of 5. The calls to the and and + functions do not add to the specificity of the rule.

Complexity Strategy

Among rules of the same salience, newly activated rules are placed above all activations of rules with equal or lower specificity.

LEX Strategy

Among rules of the same salience, newly activated rules are placed using the OPS5 strategy of the same name. First, the recency of the pattern entities that activated the rule is used to determine where to place the activation. Every fact and instance is marked internally with a "time tag" to indicate its relative recency with respect to every other fact and instance in the system. The pattern entities associated with each rule activation are sorted in descending order for determining placement. An activation with a more recent pattern entities is placed before activations with less recent pattern entities. To determine the placement order of two activations, the sorted time tags of the two activations are compared one by one starting with the largest time tags. The comparison should continue until one activation's time tag is greater than the other activation's corresponding time tag. The activation with the greater time tag is placed before the other activation on the agenda.

If one activation has more pattern entities than the other activation and the compared time tags are all identical, then the activation with more time tags is placed before the other activation on the agenda. If two activations have the exact same recency, the activation with the higher specificity is placed above the activation with the lower specificity. Unlike OPS5, the not conditional elements in CLIPS have pseudo time tags which are used by the LEX conflict resolution strategy. The time tag of a not CE is always less than the time tag of a pattern entity, but greater than the time tag of a not CE that was instantiated after the not CE in question.

As an example, the following six activations have been listed in their LEX ordering (where the comma at the end of the activation indicates the presence of a not CE). Note that a fact's time tag is not necessarily the same as its index (since instances are also assigned time tags), but if one fact's index is greater than another fact's index, then it's time tag is also greater. For this example, assume that the time tags and indices are the same.

rule-6: f-1,f-4
rule-5: f-1,f-2,f-3,
rule-1: f-1,f-2,f-3
rule-2: f-3,f-1
rule-4: f-1,f-2,
rule-3: f-2,f-1

Shown following are the same activations with the fact indices sorted as they would be by the LEX strategy for comparison.

rule-6: f-4,f-1
rule-5: f-3,f-2,f-1,
rule-1: f-3,f-2,f-1
rule-2: f-3,f-1
rule-4: f-2,f-1,
rule-3: f-2,f-1

MEA Strategy

Among rules of the same salience, newly activated rules are placed using the OPS5 strategy of the same name. First, the time tag of the pattern entity associated with the first pattern is used to determine where to place the activation. An activation whose first pattern's time tag is greater than another activations first pattern's time tag is placed before the other activation on the agenda. If both activations have the same time tag associated with the first pattern, then the LEX strategy is used to determine placement of the activation. Again, as with the CLIPS LEX strategy, negated patterns have pseudo time tags.

As an example, the following six activations have been listed in their MEA ordering (where the comma at the end of the activation indicates the presence of a negated pattern).

rule-2: f-3,f-1
rule-3: f-2,f-1
rule-6: f-1,f-4
rule-5: f-1,f-2,f-3,
rule-1: f-1,f-2,f-3
rule-4: f-1,f-2

Random Strategy

Each activation is assigned a random number which is used to determine its placement among activations of equal salience. This random number is preserved when the strategy is changed so that the same ordering is reproduced when the random strategy is selected again (among activations that were on the agenda when the strategy was originally changed).

The inference engine 245 determines if there are any facts that have been modified during the execution process. If one or more modified facts are found, then the modified facts are placed in fact sets. The inference engine 245 repeats blocks (810-820) if any of the facts in the fact sets have been modified.

A naive implementation of an expert system may check each rule against the known facts in the knowledge base 250, fire that rule if necessary, move on to the next rule, and loop back to the first rule when finished. For even moderate sized rules and facts knowledge-bases, this method is slow.

Figure 9:
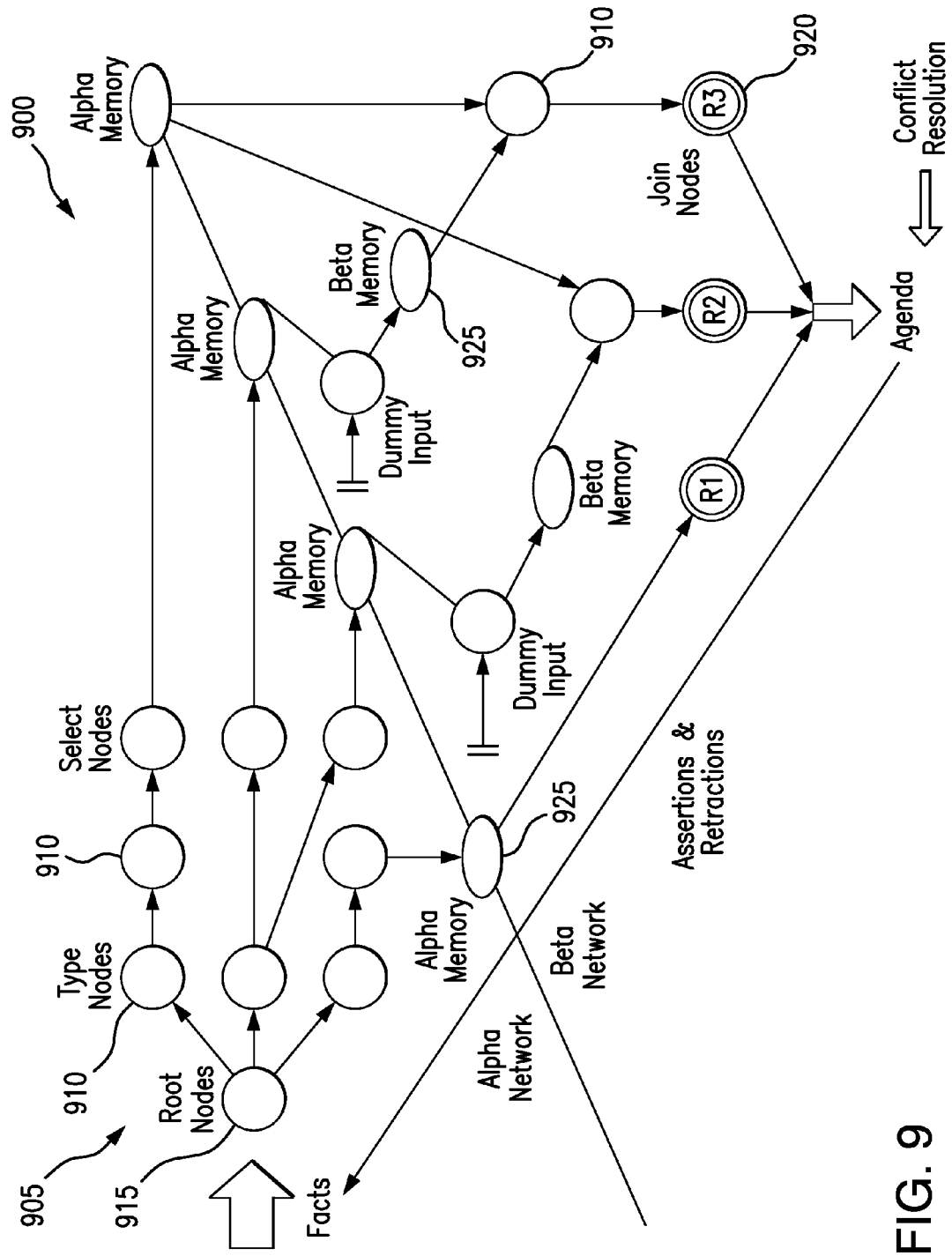
FIG. 9 illustrates the basic Rete topography and shows associations between different node types and memories.

In an embodiment, the present invention employs a version of the Rete algorithm for implementing blocks 810-820 of FIG. 8 above as described in http://en.wikipedia.org/wiki/Rete_algorithm. FIG. 9 illustrates the basic Rete topography 900, and shows the associations between different node types and memories. A Rete-based expert system builds a network of nodes 905, where each node 910 (except the root node 915) corresponds to a pattern listed of the left-hand-side (the condition part) of a rule. The path from the root node 915 to a leaf node 920 defines a complete rule left-hand-side. Each node has a memory of facts 925 which satisfies that pattern (as specified in the "if" statement of the rule). The resulting data structure resembles a generalized tree. As new facts are asserted or modified, they propagate along the network, causing nodes to be annotated when that fact matches that pattern. When a fact or combination of facts causes all of the patterns for a given rule to be satisfied, a leaf node 920 is reached and the corresponding rule 930 is triggered.

The Rete algorithm is designed to sacrifice memory for increased speed. In most cases, the speed increase over naïve implementations is several orders of magnitude (because Rete performance is theoretically independent of the number of rules in the system) in very large expert systems.

In order to integrate with a Django web framework (i.e., the web-based front-end application 1010 of FIG. 10 below), PyClips may be selected as a high-level interface to the CLIPS environment. PyClips is an application released under LGPL (Lesser General Public License) software license. PyClips embeds a fully functional CLIPS engine into Python and provides developers with a Python-friendly interface to CLIPS.

Figure 10:
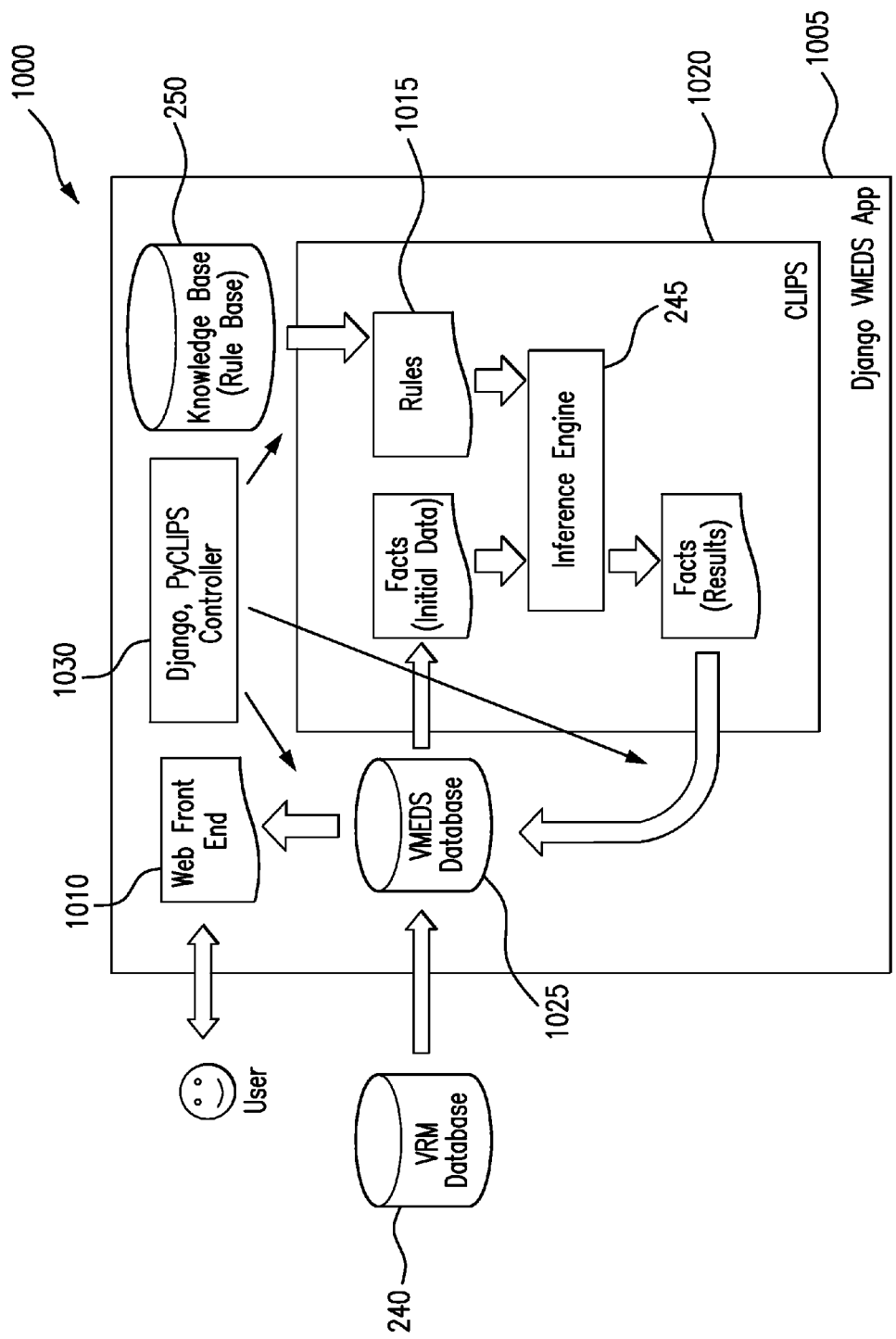
FIG. 10 is a block diagram of one embodiment of a software architecture corresponding to a CLIPS-based expert system employed in the system architecture of FIGS. 1 and 2.

FIG. 10 is a block diagram of one embodiment of a software architecture 1000 corresponding to the CLIPS-based expert system 235 employed in the system architecture of FIGS. 1 and 2. A Django-based expert system application module 1005 (hereinafter the "Vulnerability Management Expert Decision System (VMEDS)" module 1005) is independent of the VRM module 170. A person skilled in the art will appreciate that other expert system modules may be substituted for the VMEDS module 1005. The core of the VMEDS module 1005 is the scalable manually-designed knowledge base 250. The VMEDS module 1005 includes a web-based front-end application 1010 to control data flow, optimize the false positive elimination process, and interact with the end user 140.

In the VMEDS module 1005, expert knowledge is translated into the scalable knowledge base 250 (i.e., a rule base 250). Each rule 1015 is represented by a Python file in a rule base folder 1015. At system starting time, the VMEDS module 1005 scans the rule base folders 1015 and automatically imports all enabled rules into the CLIPS environment 1020. The initial data of a VMEDS database 1025 is imported from the VRM vulnerability database 240. In order to begin a transaction, the VMEDS module 1005 builds facts 1025 from the VMEDS database 1025 and exports the built facts 1025 into the CLIPS environment 1020, which are, in turn, saved back to the VMEDS database 1025 after the transaction is completed.

As discussed above, the VMEDS module 1005 employs several programming languages and open source projects, including CLIPS, Python, Django, and PyClips. CLIPS is used to build the inference engine 245 and its related rules and data. Django is used to build the MVC (Model-View-Controller) feature 1030 of the VMEDS module 1005 and handle the web-based front-end application 1010. PyClips is employed to connect CLIPS with Python. In terms of programming language, the system is written in Python and CLIPS.

In the VMEDS module 1005, knowledge is accumulated in the form of rules 1015 in the rule base 250. In one embodiment, a rule 1015 may have the form:
IF conditions combination THEN actions In one embodiment, each rule 1015 along with all of its auxiliary functions may be incorporated into a python module which serves as a separate functionality plug-in. Each plug-in is operable to handle a specific vulnerability scenario. As a result, the knowledge base 250 may be expanded by converting knowledge into rules (plug-ins). This modular design permits: (1) the VMEDS module 1005 to be maintainable by having independence between the rules 1015 and the inference engine 245 and (2) renders the VMEDS module 1005 more extendable because of the simplicity of adding or removing specific rules.

In an embodiment, the VMEDS module 1005 employs two types of rules: validation rules and detection rules. Validation rules are used to test vulnerabilities that already have detailed information in the knowledge (rules) base 250. These rules gather resources from other scanners, libraries, external information feeds or methods to test if the vulnerabilities are false-positives, or if their risk factors need to be changed. Detection rules, however, apply to vulnerabilities that lack sufficient details. For detection rules, detailed information concerning vulnerabilities needs to be determined before risk factors are evaluated. For example, the VRM module 170 may determine that certain ports are open on a host, but it is not fully clear which services are running on those ports. In such circumstances, detection rules are needed to help detect actual vulnerabilities before further steps are performed.

The VMEDS module 1005 handles data flow using Django database models. As a separate Django application, the VMEDS module 1005 includes its own tables in a VMEDS database 1025 independent of the VRM vulnerability database 240. The VMEDS module 1005 provides methods to import data from the VRM vulnerability database 240, but all follow-up operations are performed in the VMEDS database 1025. The decoupled design of data storage provides more flexibility for result management.

In the VMEDS module 1005, each template in CLIPS is associated with a Django database model. The VMEDS module 1005 employs a general method to automatically build CLIPS templates from existing Django models. This scalable design enables template sets to expand along with the models.

A fact is also related to a specific Django model. The VMEDS module 1005 automatically builds facts from model entries and exports these facts into CLIPS. After processing these facts in CLIPS, the VMEDS module 1005 converts these facts into database entries and saves the facts back in the VMEDS database 1025.

Figure 11A:
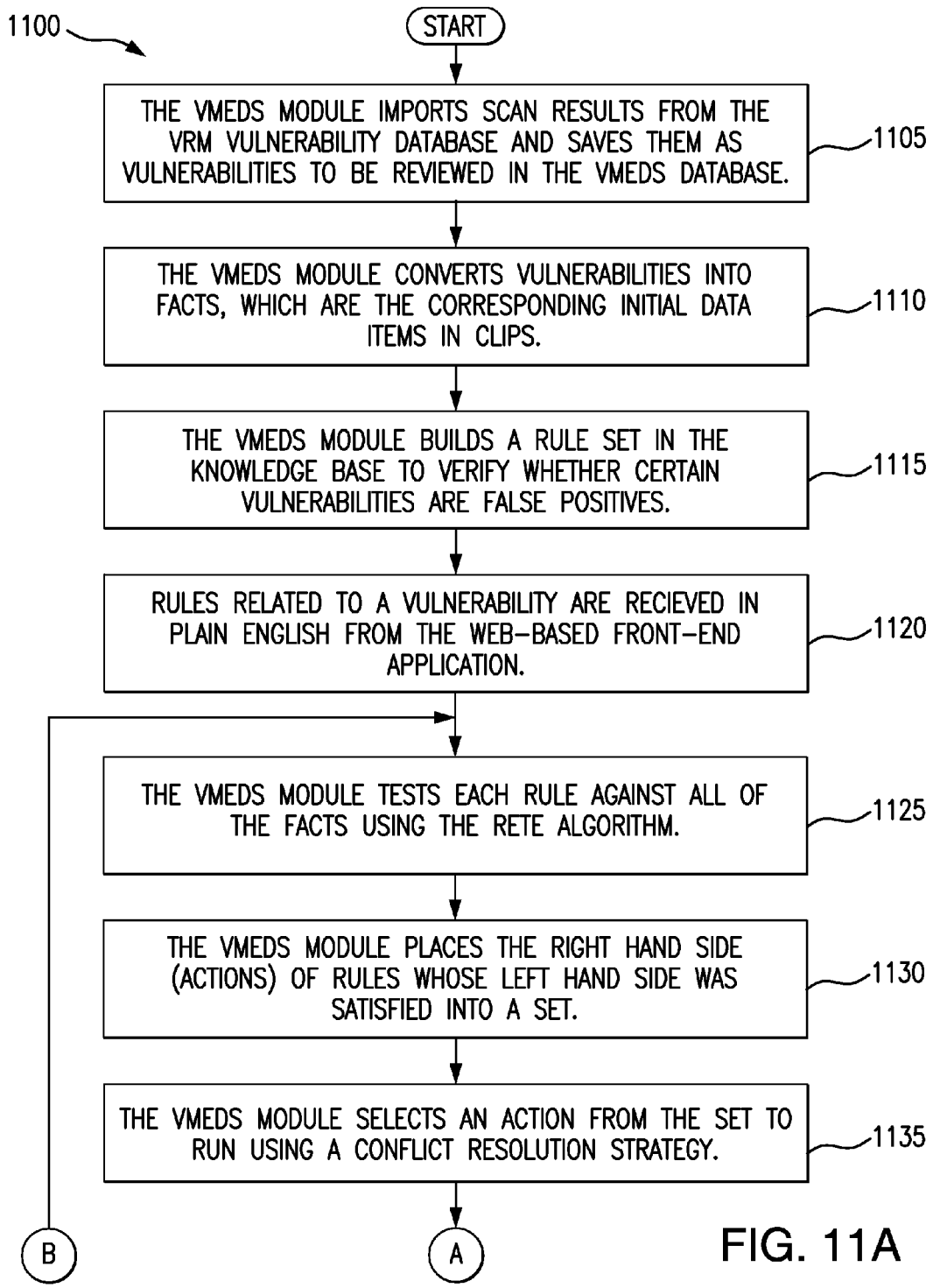
FIGS. 11A-11B are a flow diagram illustrating one embodiment of a method for employing an inference engine and a knowledge base to refine results stored in the VRM vulnerability database of FIG. 2 by removing extraneous information and false positives.
Figure 11B:
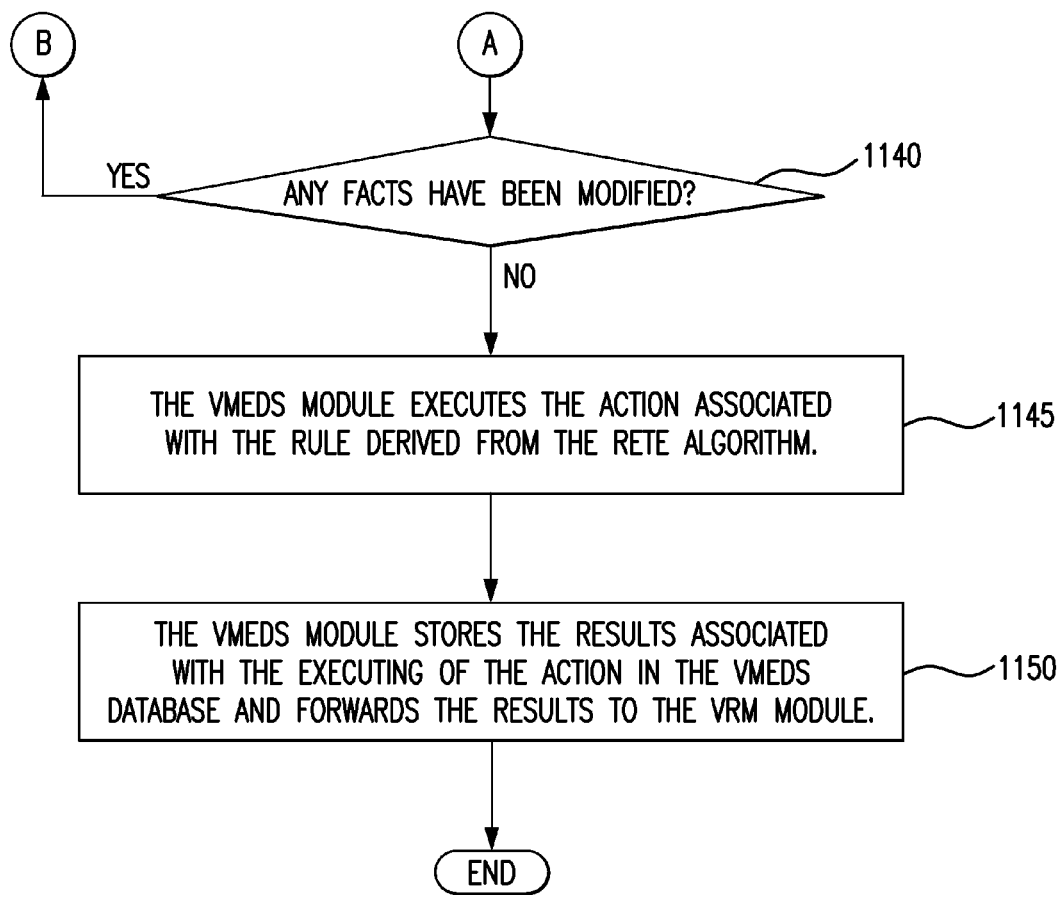

FIGS. 11A-11B are a flow diagram illustrating one embodiment of a method 1100 for employing the inference engine 245 and the knowledge base 250 (as embodied in the VMEDS module 1005) to refine results stored in the VRM vulnerability database 240 by removing extraneous information and false positives. To begin a transaction, the VMEDS module 1005 is operable to build the fact base in the VMEDS database 1025. At block 1105, the VMEDS module 1005 imports scan results (raw, unverified vulnerabilities discovered by the various back-end modules 205-232 for performing vulnerability checks on a vulnerability type basis associated with the VRM module 170) from the VRM vulnerability database 240 and saves the scan results as vulnerabilities to be reviewed in the VMEDS database 1025. The VMEDS database 1025 typically contains a large number of vulnerability entries. At block 1110, the VMEDS module 1005 converts vulnerabilities into facts, which are the corresponding initial data items in CLIPS. In an embodiment, a typical vulnerability data item may have fields such as id, host, port, risk_factor, status, etc. Items in the VMEDS database 1025 and corresponding facts in CLIPS are substantially one.

At block 1115, the VMEDS module 1005 builds a rule set in the knowledge base 250 to verify whether certain vulnerabilities are false positives. Each rule has several conditions and actions. For a vulnerability retrieved from the VMEDS database 1025, if all the conditions of a rule are satisfied, the actions of that rule may be executed. At block 1120, rules related to a vulnerability are received in plain English from the web-based front-end application 1010. More particularly, the VMEDS module 1005 imports the plain English rules to CLIPS and added them to the rule set. As described above, each CLIPS rule is encapsulated along with its auxiliary python methods into a python module, which is imported into CLIPS environment 1020 by the main logic of the inference engine 245.

At this point in the main logic of the method 1100, steps identical or similar to those executed in the method 800 of FIG. 8 may be executed. More particularly, at block 1125, the VMEDS module 1005 tests each rule against all of the facts using the Rete algorithm. At block 1130, the VMEDS module 1005 places the right hand side (actions) of rules whose left hand side was satisfied into a set. At block 1135, the VMEDS module 1005 selects an action from the set to run using a conflict resolution strategy. If, at block 1140, any facts have been modified, then blocks 1125 to 1135 are repeated; otherwise, at block 1145, the action associated with the rule derived from the Rete algorithms is executed. At block 1150, the VMEDS module 1005 stores the results associated with the executing of the action of block 1145 in the VMEDS database 1025 and forwards the results to the VRM module 170.

As one concrete example, the VMEDS module 1005 may be summoned by the VRM module 170 to render a decision concerning the vulnerability "detecting DNS recursive queries". This rule intends to verify the DNS recursive query vulnerability by inspecting an IP address, port, and common vulnerability exposure (CVE). The resulting built facts base may include the entries shown in Table 3 as follows:

TABLE 3

| CVE id | host | port | risk_factor | status |
|---|---|---|---|---|
| 1.3.6.1.4.1.25623.1.0.801690 | 64.0.0.1 | 53/UDP | Medium | Pending |

After the rule set is built, rules related to the vulnerability "detecting DNS recursive queries" may be described in plain English as follows:
Check whether UDP port 53 is open, the target IP is routable, and the vulnerability check "id" matches a specific number.
If all the conditions are satisfied, the vulnerability is confirmed as a high risk. This rule has three conditions:
1) If UDP port 53 is open
2) If host is routable
3) If vulnerability check is 1.3.6.1.4.1.25623.1.0.801690
The following actions are executed when and only when all conditions have been satisfied:
1) Modify risk_factor to "High"
2) Modify status to "Verified"
The VMEDS module 1005 translates these rules from plain English to CLIPS and adds them to the rule set. After executing the main logic of the method 1100 according to the Rete algorithm, the action of the example rule may be executed. As a result, the "Risk factor" field of the vulnerability will is modified to "High" (i.e., a high risk) and status is modified to "Verified" (i.e., it is confirmed and it is not a false positive). The vulnerability in the example becomes:

| CVE id | host | port | risk_factor | status |
|---|---|---|---|---|
| 1.3.6.1.4.1.25623.1.0.801690 | 64.0.0.1 | 53/UDP | High | Verified |

This result is stored back in the VMEDS database 1025 and exported the VRM module 170.

The following is a concrete example of how rules are written and added to the VMEDS module 1005. This example attempts to verify those vulnerabilities in which an Internet-accessible web directory contains backup files with usernames or passwords in those files. The rule described in plain English is as follows:
If the target's protocol is TCP, port is 80 or 443, and the web directory is Internet accessible, then fetch backup files from the web directory and check if they contain keyword "username" or "password". If all the conditions are satisfied, the vulnerability is confirmed as a high risk.

To add this rule to the VMEDS module 1005, a python module is written that contains this rule expressed in CLIPS and all its auxiliary python methods. Auxiliary python methods are useful to further check or verify information before confirming the vulnerability. This example uses user defined method "scan_webdir". "scan_webdir" is a python function which accepts a web directory url as an argument, and scans this directory for '.bkp' files. If '.bkp' files are found, then the method scans each file for keyword 'username' and 'password' in a case-insensitive way.

Figure 12:
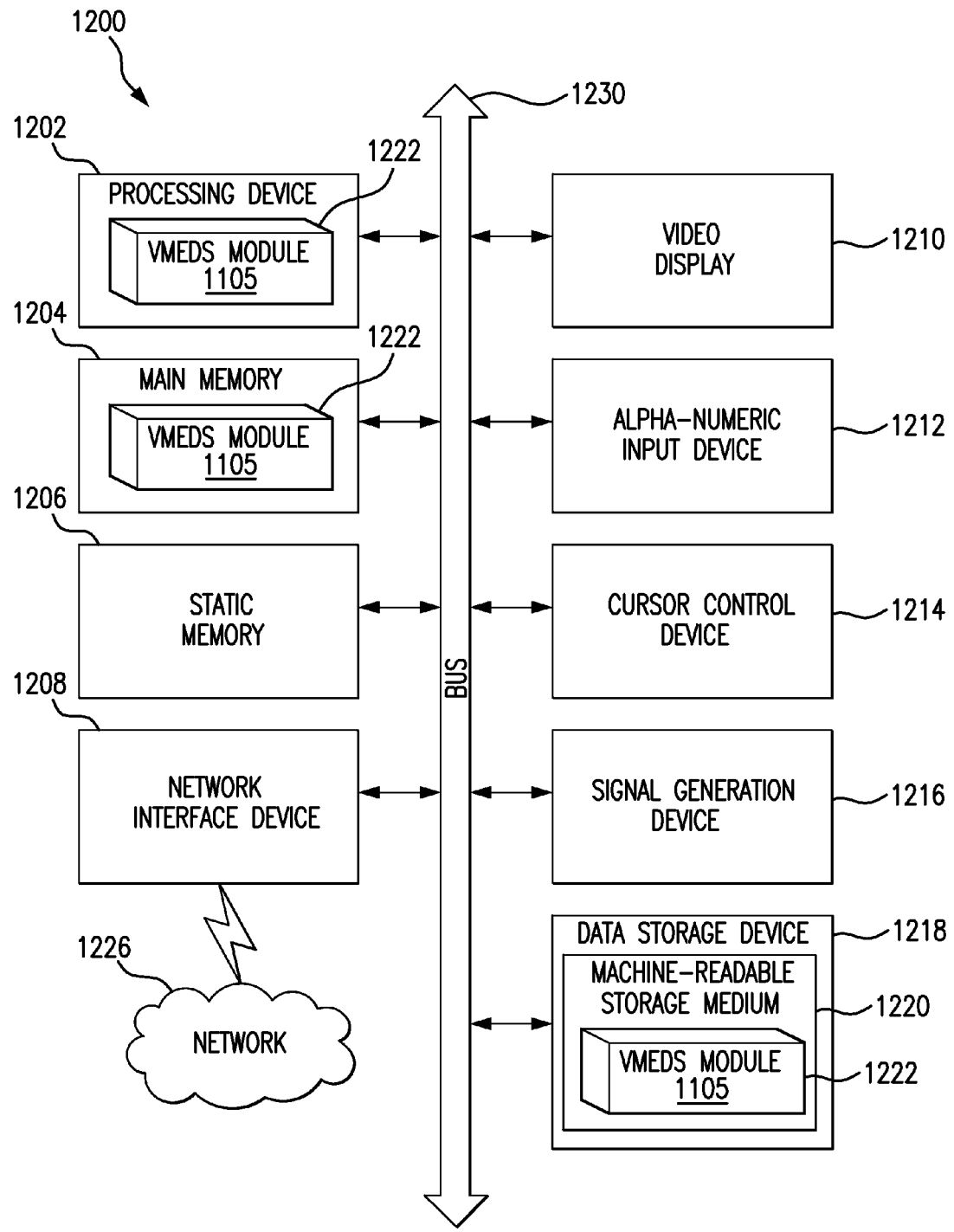
FIG. 12 illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) (such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1002 is configured to execute device queue manager logic 1022 for performing the operations and steps discussed herein.

Computer system 1200 may further include a network interface device 1208. Computer system 1000 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

Data storage device 1218 may include a machine-readable storage medium (or more specifically a non-transitory computer-readable storage medium) 1220 having one or more sets of instructions (e.g., the VMEDS module 1005) embodying any one or more of the methodologies of functions described herein. The VMEDS module 1005 may also reside, completely or at least partially, within main memory 1204 and/or within processing device 1202 during execution thereof by computer system 1200; main memory 1204 and processing device 1202 also constituting machine-readable storage media. Content processing logic 1222 may further be transmitted or received over a network 1226 via network interface device 1208.

Machine-readable storage medium 1220 may also be used to store the device queue manager logic persistently. While machine-readable storage medium 1220 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein may be implemented as discrete hardware components or integrated in the functionality of hardware components such as ASICs, FPGAs, DSPs or similar devices. In addition, these components may be implemented as firmware or functional circuitry within hardware devices. Further, these components may be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for vulnerability risk management of an enterprise computer system, comprising the steps of:

receiving, by an expert system, a list of potential vulnerabilities of the enterprise computer system from a vulnerability risk management module, wherein the expert system and the vulnerability risk management module are instantiated by a cloud computing system;

converting a potential vulnerability on the list of potential vulnerabilities into a set of facts;

verifying that the potential vulnerability is not a false positive by testing a rule against the set of facts;

executing an action associated with the rule that modifies a fact of the set of facts to produce a modified set of facts when the conditions of the rule have been satisfied;

incorporating the modified set of facts into a refined list of vulnerabilities; and transmitting the refined list of vulnerabilities to the vulnerability risk management module.

2. The method of claim 1, wherein testing the set of rules against the set of facts comprises applying a Rete algorithm to activate one or more actions associated with the set of rules.

3. The method of claim 2, further comprising selecting the action to be executed from a plurality of actions activated by the application of the Rete algorithm.

4. The method of claim 3, further comprising imposing an ordering execution of the plurality of activated actions using a conflict resolution strategy.

5. The method of claim 4, wherein imposing the ordering of execution of the plurality of activated actions using the conflict resolution strategy comprises:

(a) placing a newly activated rule and associated activated actions above a rule of lower salience and below a rule of higher salience; and (b) applying the conflict resolution strategy to determine a placement of activated rules of equal salience.

6. The method of claim 5, further comprising: (c) if steps (a) and (b) cannot specify ordering, arbitrarily ordering activated rules.

7. The method of claim 4, wherein the conflict resolution strategy is one of depth, breadth, simplicity, complexity, lex, mea, or random.

8. The method of claim 1, wherein the refined list of vulnerabilities is substantially free of extraneous information.

9. The method of claim 1, wherein the set of rules is based on a received type of vulnerability.

10. A system for vulnerability risk management of an enterprise computer system, comprising:
a processor interfacing with a memory, the processor being programmable to:
receive a list of potential vulnerabilities of the enterprise computer system from a vulnerability risk management module, wherein the expert system and the vulnerability risk management module are instantiated by a cloud computing system;
convert a potential vulnerability on the list of potential vulnerabilities into a set of facts;
verify that the potential vulnerability is not a false positive by testing a rule against the set of facts;
execute an action associated with the rule that modifies a fact of the set of facts to produce a modified set of facts when the conditions of the rule have been satisfied;
incorporate the modified set of facts into a refined list of vulnerabilities; and
transmit the refined list of vulnerabilities to the vulnerability risk management module.

11. The system of claim 10, wherein testing the set of rules against the set of facts comprises applying a Rete algorithm to activate a plurality of actions associated with the set of rules.

12. The system of claim 11, further comprising selecting an action to be executed from a plurality of actions activated by the application of the Rete algorithm.

13. The system of claim 12, further comprising imposing an ordering of execution of the plurality of activated actions using a conflict resolution strategy.

14. The system of claim 13, wherein imposing the ordering of execution of the plurality of activated actions using the conflict resolution strategy comprises:
(a) placing a newly activated rule and associated activated actions above a rule of lower salience and below a rule of higher salience; and
(b) applying the conflict resolution strategy to determine a placement of activated rules of equal salience.

15. The system of claim 14, further comprising: (c) if steps (a) and (b) cannot specify ordering, arbitrarily ordering activated rules.

16. The system of claim 13, wherein the conflict resolution strategy is one of depth, breadth, simplicity, complexity, lex, mea, or random.

17. The system of claim 10, wherein the refined list of vulnerabilities is substantially free of at least one of extraneous information.

18. The system of claim 10, wherein the set of rules is based on a received type of vulnerability.

19. A non-transitory computer-readable storage medium including instructions that, when accessed by a processing system, cause the processing system to perform a method for vulnerability risk management of an enterprise computer system, comprising the steps of:
receiving, by an expert system, a list of potential vulnerabilities of the enterprise computer system from a vulnerability risk management module, wherein the expert system and the vulnerability risk management module are instantiated by a cloud computing system;
converting a potential vulnerability on the list of potential vulnerabilities into a set of facts;
verifying that the potential vulnerability is not a false positive by testing a rule against the set of facts;
executing an action associated with the rule that modifies a fact of the set of facts to produce a modified set of facts when the conditions of the rule have been satisfied;
incorporating the modified set of facts into a refined list of vulnerabilities; and
transmitting the refined list of vulnerabilities to the vulnerability risk management module.

20. The non-transitory computer-readable storage medium of claim 19, wherein testing the set of rules against the set of facts comprises applying a Rete algorithm to activate a plurality of actions associated with the set of rules.

* * * * *